United States Patent
Kessler et al.

(10) Patent No.: US 6,445,286 B1
(45) Date of Patent: Sep. 3, 2002

(54) METHOD FOR OPERATING A DEVICE FOR THE MONITORING AND WIRELESS SIGNALING OF A PRESSURE CHANGE IN PNEUMATIC TIRES OF A VEHICLE

(75) Inventors: Ralf Kessler, Pfinztal; Andreas Kuhnle, Maulbronn; Norbert Normann, Niefern-Oschelbronn; Gunter Lothar Schulze, Ispringen, all of (DE)

(73) Assignee: Beru Aktiengesellschaft, Ludwigsburg (DE)

( * ) Notice: Subject to any disclaimer, the term of this patent is extended or adjusted under 35 U.S.C. 154(b) by 0 days.

(21) Appl. No.: 09/601,927

(22) PCT Filed: Dec. 8, 1999

(86) PCT No.: PCT/EP99/09652

§ 371 (c)(1),
(2), (4) Date: Oct. 12, 2000

(87) PCT Pub. No.: WO00/34063

PCT Pub. Date: Jun. 15, 2000

(30) Foreign Application Priority Data

Dec. 9, 1998 (DE) ........................................ 198 56 860

(51) Int. Cl.⁷ .............................................. B60C 23/00
(52) U.S. Cl. ........................ 340/442; 340/445; 340/447
(58) Field of Search ................................. 340/442, 445, 340/447; 73/146.3, 146.5, 146.2; 116/34 R

(56) References Cited

U.S. PATENT DOCUMENTS

| | | | | |
|---|---|---|---|---|
| 5,335,540 A | * | 8/1994 | Bowler et al. | 340/447 |
| 5,602,524 A | * | 2/1997 | Mock et al. | 340/447 |
| 5,731,516 A | * | 3/1998 | Handfield et al. | 73/146.5 |
| 5,825,286 A | | 10/1998 | Coulthard | 340/447 |
| 6,112,165 A | * | 8/2000 | Uhl et al. | 340/447 |
| 6,182,021 B1 | * | 1/2001 | Izumi et al. | 340/444 |

FOREIGN PATENT DOCUMENTS

| | | |
|---|---|---|
| DE | 3703128 | 8/1988 |
| DE | 19602593 | 5/1997 |
| DE | 19608478 | 5/1997 |
| EP | 0657314 | 6/1995 |
| WO | 9214620 | 9/1992 |
| WO | 9700784 | 1/1997 |

* cited by examiner

Primary Examiner—Van Trieu
(74) Attorney, Agent, or Firm—Horst M. Kasper

(57) ABSTRACT

A method for operating a device for monitoring and indicating a pressure change in vehicle tires by wire, being preferably arranged in the tire as one module together with the tire valve, and comprising a current source, a pressure sensor arranged for measuring the tire pressure at first time intervals, an analog/digital converter for digitizing a pressure signal obtained from the pressure sensor, a memory for storing the pressure signal, a transmitter for transmitting the measured tire pressure information to a receiving unit located in the vehicle, a comparator, especially one realized in one module with a microprocessor, which compares the pressure signal with a previously stored comparison pressure signal and controls the transmitter in such a way that the transmitter will transmit signals at second time intervals greater than the first time intervals, so long as the decrease of the pressure signal, relative to the comparison pressure signal (drift), does not exceed a threshold value, but will transmit signals at third time intervals smaller than the second time intervals when and so long as the drift exceeds the pressure threshold value; to this end the second time intervals are varied in response to one or more physical conditions that are measured in the tire and that vary in driving operation.

18 Claims, 1 Drawing Sheet

METHOD FOR OPERATING A DEVICE FOR THE MONITORING AND WIRELESS SIGNALING OF A PRESSURE CHANGE IN PNEUMATIC TIRES OF A VEHICLE

BACKGROUND OF THE INVENTION

1. Field of the Invention

The present invention proceeds from a method having the features defined in the preamble of claim 1.

2. Description of the Related Art

A method of this kind has been known from WO 97/00784. That document discloses a method for operating a device for monitoring and indicating a pressure change in vehicle tires by wire, being arranged in the tire as one module together with a valve, and comprising a current source, a pressure sensor arranged for measuring the tire pressure at first time intervals, an analog/digital converter for digitizing a pressure signal obtained from the pressure sensor, a memory for storing the pressure signal, a transmitter for transmitting the measured tire pressure information to a receiving unit located in the vehicle, and a comparator, especially one realized in one module with a microprocessor or a similar microelectronic processing unit. The comparator compares each pressure signal that has been picked up and transmitted by the pressure sensor with a previously stored comparison pressure signal. The last pressure signal measured, or a mean value derived from a plurality, for example from three, measured pressure signals is used as the reference pressure signal. The comparator controls the transmitter in such a way that the transmitter will transmit signals at second time intervals greater than the first time intervals as long as the decrease of the pressure signal relative to the reference pressure signal (referred to herein as pressure signal drift or, simply, as drift) does not exceed a threshold value during a predetermined time interval, but will transmit signals at third time intervals smaller than the second time intervals when and as long as the drift exceeds the pressure threshold value. This operating mode is based on the consideration that the by far greatest part of tire punctures that are accompanied by a pressure loss are due to, or announce themselves by, a slow "creeping" pressure loss. In a practical embodiment of a device for monitoring tire pressure the first time intervals are 3 s,
the second time intervals are 54 s,
and the drift threshold value at which a change-over occurs from the slow transmission rate (time intervals of 54 s) to the rapid transmission rate at third time intervals is 0.2 bar/min.

The third time intervals are only 0.8 s with the known device; these are the short time intervals at which measurements are taken and transmitted in the case of the known device when the drift exceeds the threshold value, in order to be able, in any case, to detect and signal any dangerous pressure loss at an early point in time. With the measuring and transmission rate that can be changed over in the described way, a battery service life of 7 to 8 years has been reached in such electronic devices at wheels. There is, however, a demand for an additional extension of the battery service life. From another commercially available device for monitoring and signaling tire pressure by radio it has been known to provide a centrifugal switch in the form of a reed switch as part of the wheel electronics, which switch is closed when the respective wheel turns at a speed of at least approximately 25 km/h so that the wheel electronics will be activated only when the vehicle is in motion and that speed is exceeded. The wheel electronics therefore consumes no battery current in the stationary condition of the vehicle. The system is, however, connected with the disadvantage that the centrifugal switch, being an electromechanical component, is prone to failure so that reliable operation over many years cannot be guaranteed. A further disadvantage lies in the fact that no tire pressure monitoring is effected at low driving speed, during times of traffic congestion and during stop-and-go moving conditions and that there is no stable speed threshold beyond which monitoring takes place. In addition, current consumption under moving conditions is still excessively high also with these other available wheel electronics.

BRIEF SUMMARY OF THE INVENTION

Now, it is the object of the present invention to further extend battery service life in a device for monitoring the tire pressure of the before-mentioned kind, without impairing the safety and reliability of the current tire pressure monitoring operation and without sacrificing the tire pressure monitoring operation in the stationary condition of the vehicle.

This object is achieved by a method having the features defined in claim 1. Advantageous further developments of the invention are the subject-matter of the sub-claims.

DETAILED DESCRIPTION OF THE INVENTION

Figure 1:
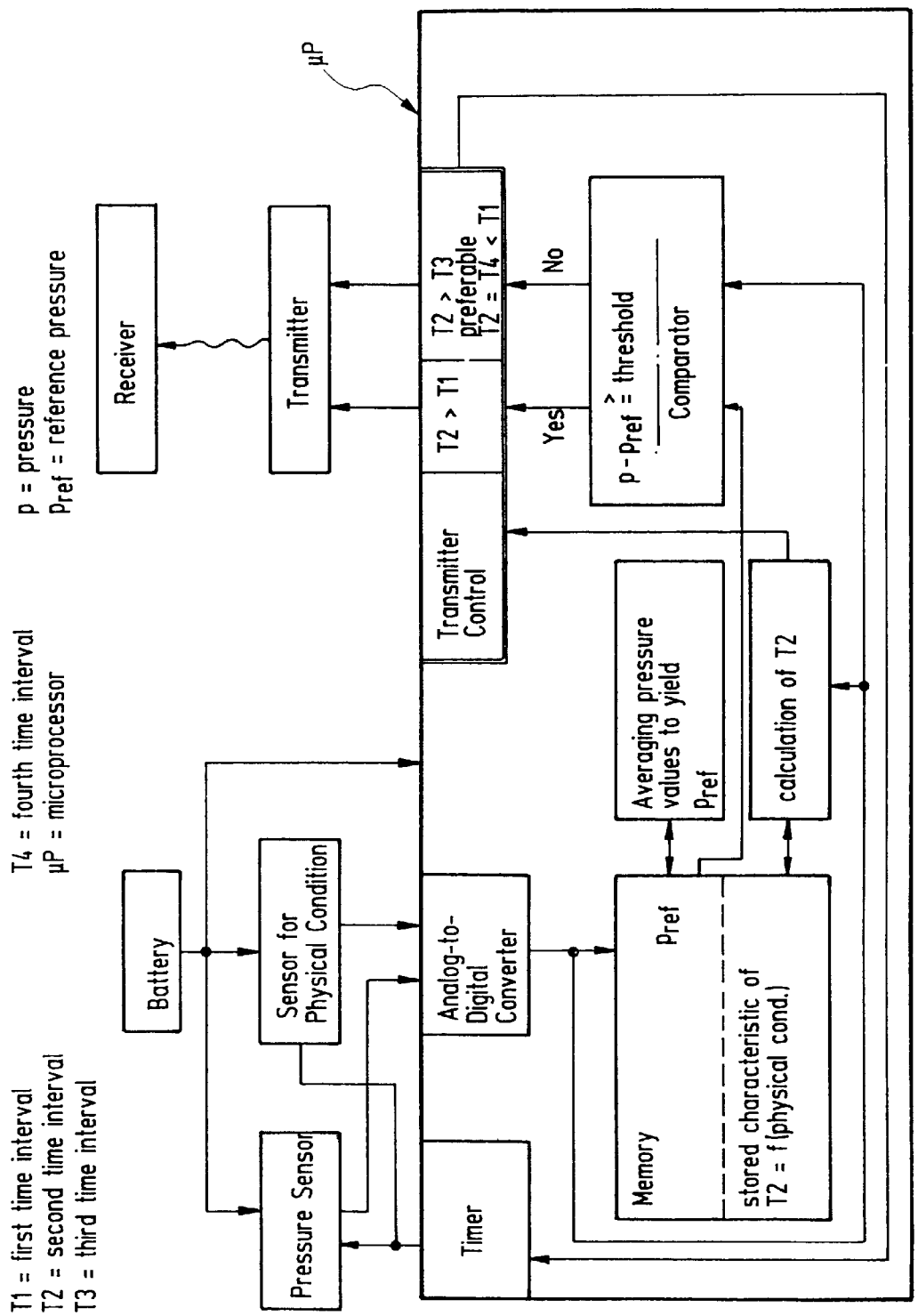
FIG. 1 is a view of a schematic diagram showing the elements employed in the process.

According to the invention, the second time intervals, during which a pressure signal is transmitted by the wheel electronics to the receiver in the vehicle, even when the drift of the pressure signal does not exceed the threshold value, are not kept constant, but are varied in response to one or more physical conditions that are measured in the tire and which vary during driving operation. This provides the possibility to extend the second time intervals under conditions that are characterized by a reduced safety risk, and to thereby reduce the frequency of activating the transmitter and, thus, to save power. It has been found that it is possible in this way to extend the battery service life to more than 10 years.

An important point with respect to safety is the speed of the vehicle. The pressure loss in a vehicle tire is much more dangerous at high speed than at low speed. However, most of the vehicles move predominantly at relatively low speed (city traffic). Consequently, the method preferably is carried out in such a way that the second time intervals are reduced as the speed of the vehicle rises, or are extended as speed decreases. Since the speedometer present in any vehicle cannot be connected to the wheel electronics, a speed-dependent signal has to be derived in the wheel electronics itself. This can be effected using an electronic centrifugal sensor. The centrifugal force is proportional to the rotational speed of the wheel and, thus, proportional to the driving speed. A centrifugal sensor is one that responds to centrifugal acceleration. Miniaturized acceleration sensors on semiconductor basis, that can be integrated in wheel electronics at relatively low expense, are commercially available. Especially well suited is a piezoresistive acceleration sensor comprising a membrane with a mass body affixed to it, for example by gluing, which distorts the membrane under the effect of the centrifugal force whereby an electric voltage is produced due to the piezo-effect, the magnitude of such voltage providing a measure of the centrifugal force. The relationship between voltage and driving speed may be, but need not necessarily be linear. Such a piezoresistive centrifugal sensor is very reliable. It allows the time intervals, at which the sensor is activated when no tire pressure drift exceeding a threshold value has been determined, to be reduced linearly with increasing speed. However, a linear relationship is by no means compulsory. In fact, the second time interval may be varied according to a non-linear characteristic, it being particularly advantageous to reduce it superproportionally as speed increases.

Preferably, the second time intervals are the longest in the stand still condition of the vehicle, although the wheel electronics are not completely switched off in the stand still condition of the vehicle. Rather, a dangerous pressure loss occurring in the stand still condition of the vehicle may be signalled to the driver already before he starts his journey.

Especially suited as second time intervals for activating the transmitter in the stand still condition of the vehicle are 5 minutes to 30 minutes, a second time interval of 10 minutes to 15 minutes being particularly preferred. Preferably, the second time intervals are long in the stand still condition of the vehicle, compared with the second time intervals in the driving condition of the vehicle. According to the invention, under low-risk driving conditions (slow motion and stand still condition) the second time intervals, at which the transmitter transmits signals, may be extended considerably beyond the second time interval of 54 s used by the known device. Under driving conditions, when higher risks exist, on the other hand the invention allows to transmit signals at shorter time intervals than the rigid 54 s known from the prior art and to thereby gain in safety. All in all, the invention permits a transmission rate exactly adapted to the risk, and thereby achieves two advantages which otherwise can be united only with difficulty, namely high safety in combination with extended battery service life.

If the second time intervals are reduced when the threshold value of the pressure signal drift is exceeded, then the intervals are conveniently reduced to the first time intervals at which the pressure sensor measures the tire pressure so that any dangerous developments can be quickly detected. Preferably, however, when the drift threshold value is exceeded, the first time intervals are reduced simultaneously—as in the case of the practical embodiment of the tire pressure monitoring device according to WO 97100784—and the pressure is both measured and transmitted and evaluated in the receiving unit in fourth time intervals shorter than the first time intervals.

From a method disclosed in DE 196 08 478 it has been known in connection with a device for monitoring and wireless signalling a pressure change in vehicle tires to determine, before the beginning of each journey, the wheel position associated with each identifier from the signals transmitted to the receiving unit, which signals contain not only a pressure datum but also an identifier of each wheel position. Thus, the receiving unit is in a position to determine independently if a wheel has been changed, for example as part of an exchange of winter wheels for summer wheel, or when a spare wheel has been mounted. When using the method known from WO 97/00784, where the transmitter incorporated in the wheel electronics is activated at fixed second time intervals, a time of 15 minutes to 30 minutes is needed until the receiving unit has associated the identifiers, that were received together with the transmitted signals, with the different wheel positions: As long as this has not been done, the allocations stored last are maintained.

The learning time of the receiving unit can be reduced to a few minutes when the second time intervals are not kept constant, but are reduced or extended, according to the invention, in response to the driving condition. In order to reduce the learning time of the receiving unit it may be provided to reduce the second time intervals very strongly during a limited phase at the beginning of the journey and, preferably, to make them so short, regardless of the driving speed, that the allocation of the identifiers to the individual wheel positions is completed within no more than a few minutes.

Advantageously, the acceleration sensor may be further used to reduce the number of antennas required for receiving the signals from the different wheels. Based on differences between the radial and tangential accelerations measured on the different wheels, it is possible to distinguish between steered and non-steered wheels and between right and left wheels so that it is not necessary to assign to each wheel an antenna of its own in order to be able to distinguish between the wheels. For more details regarding this point reference is made to DE 197 35 686 and to our spending PCT Patent Application No. PCT/EP99/09648 entitled "Method for allocating identifiers in signals, emitted from transmitters in a tire pressure monitoring system, to the wheels on which the transmitters are mounted".

The tire pressure as such, and its drift, are also important conditions with respect to safety.

Consequently, an advantageous further development of the invention consists in that the second time intervals are varied also in response to the measured pressure, preferably in such a way that the drift threshold value of the pressure signal, at which the transmission rate is changed from slow to quick, is no longer preset at a constant value, but is formed in response to the pressure or to the pressure drift, the threshold value being reduced as the pressure decreases or as the drift increases. This provides the advantage that the transmission rate increases as the tire pressure decreases. This also has the effect that the transmission rate is flexibly adapted to the actual risk and that the transmission rate is higher under high-risk conditions than under lower-risk conditions.

The relation between pressure-dependent drift threshold and tire pressure or tire pressure drift needs not necessarily be linear. Rather, it may be provided to reduce the pressure threshold superproportionally as the pressure decreases or the drift rises. This, just as the selection of the second time intervals in response to the speed, also has the effect that two advantages are achieved which otherwise are hard by to unite, namely to improve the monitoring safety and to simultaneously extend the battery service life.

Pressure-dependent selection of the threshold for the pressure signal drift can be realized with particular advantage in combination with a speed-dependent selection of the second time intervals, but may also be realized independently thereof. If realized in combination with the speed-dependent selection of the second time intervals, then it is preferred to equip the microprocessor or a like microelectronic processing unit in the wheel electronics with a field of characteristics consisting of a family of characteristics each of which reflects the dependency of the second time intervals on the speed, and each being applicable to a different tire pressure or to a different drift. Controls in response to a field of characteristics are well known to the skilled man in motor vehicle technology, for example for the control of internal-combustion engines.

What is claimed is:

1. A method for operating a device for monitoring and wireless signalling a pressure change in vehicle tires, being preferably arranged in the tire in the form of a module including a tire valve, and comprising
   a power source,
   a pressure sensor arranged for measuring the tire pressure at first time intervals,
   an analog/digital converter for digitizing a pressure signal obtained from the pressure sensor,
   a memory for storing the pressure signal,
   a transmitter for transmitting the measured tire pressure information to a receiving unit located in the vehicle,
   a comparator, especially one realized physically united with a microprocessor, which compares the pressure signal with a previously stored reference pressure signal and controls the transmitter in such a way that the transmitter will transmit signals at second time intervals greater than the first time intervals as long as the decrease of the pressure signal relative to the reference pressure signal (drift) does not exceed a threshold value, but will transmit signals at third time intervals smaller than the second time intervals when and as long as the drift exceeds the pressure threshold value, characterized in that the second time intervals are varied in response to one or more physical conditions that are measured in the tire and which vary during driving operation.

2. The method as defined in claim 1, characterized in that the physical condition is the vehicle speed.

3. The method as defined in claim 2, characterized in that the second time intervals are reduced as the speed of the vehicle increases.

4. The method as defined in claim 3, characterized in that the second time intervals are kept constant in the stand still condition of the vehicle.

5. The method as defined in claim 2, characterized in that the second time intervals are the highest in the stand still condition of the vehicle.

6. The method as defined in claim 1, characterized in that the physical condition is the air pressure in the tire.

7. The method as defined in claims 6, characterized in that the threshold value of the pressure signal drift is varied in response to the pressure signal.

8. The method as defined in claim 7, characterized in that the threshold value of the drift of the pressure signal is reduced as the pressure signal decreases.

9. The method as defined in claim 1, characterized in that the physical condition is the drift of the air pressure in the tire.

10. The method as defined in claim 9, characterized in that the threshold value of the pressure signal drift is varied in response to the drift of the pressure signal.

11. The method as defined in claim 10, characterized in that the threshold value of the drift of the pressure signal is reduced as the drift decreases.

12. The method as defined in claim 2, characterized in that the second time intervals are calculated based on a predetermined field of characteristics, stored in the microprocessor, which arbitrarily specifies the dependency of the second time intervals on both the speed and the pressure signal drift.

13. The method as defined in claim 1, characterized in that the second time intervals are high in the stand still condition of the vehicle, compared with the second time intervals in the running condition of the vehicle.

14. The method as defined in claim 1, characterized in that the second time intervals are kept especially short in a phase at the beginning of the journey, and the wheel position associated with each identifier is determined during that phase from the signals transmitted to the receiving unit, which contain a characteristic identifier for each wheel position in addition to a pressure datum, and such wheel position is stored in the receiving unit.

15. The method as defined in claim 1, characterized in that the second time intervals are set at 5 minutes to 30 minutes with the vehicle in stand still condition.

16. The method as defined in claim 15, characterized in that the second time intervals are set at 10 minutes to 15 minutes with the vehicle in stand still condition.

17. The method as defined in claim 1, characterized in that the third time intervals correspond to the first time intervals so that each pressure signal measured is transmitted.

18. The method as defined in claim 1, characterized in that the tire pressure is measured and transmitted at fourth time intervals, shorter than the first time intervals, so long as the drift exceeds the threshold value.

* * * * *